(12) United States Patent
Iwatake

(10) Patent No.: US 9,566,707 B2
(45) Date of Patent: Feb. 14, 2017

(54) ROBOT CONTROLLER AND ROBOT SYSTEM FOR MOVING ROBOT IN RESPONSE TO FORCE

(71) Applicant: FANUC CORPORATION, Yamanashi (JP)

(72) Inventor: Takahiro Iwatake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 11 days.

(21) Appl. No.: 14/684,930

(22) Filed: Apr. 13, 2015

(65) Prior Publication Data

US 2015/0290796 A1 Oct. 15, 2015

(30) Foreign Application Priority Data

Apr. 14, 2014 (JP) ................................. 2014-082732

(51) Int. Cl.
  *B25J 9/00* (2006.01)
  *B25J 13/08* (2006.01)

(52) U.S. Cl.
  CPC ............ *B25J 9/0081* (2013.01); *B25J 13/085* (2013.01)

(58) Field of Classification Search
  CPC ....... B25J 9/0081; B25J 9/1694; B25J 9/1651; B25J 9/1612; B25J 9/1628; B25J 9/1633; B25J 9/1653; B25J 13/02; B25J 13/08–13/081; B25J 13/084–13/085; B25J 9/02; B25J 9/04; G01L 5/22; G05B 2219/37357; G05B 19/416; G05B 19/423; G05B 2219/40408; Y10S 901/02–901/04; Y10S 901/46

USPC ..... 700/258, 250, 253, 257; 901/2, 3, 4, 46; 318/568.13, 568.14, 568.16, 568.17, 318/568.18

See application file for complete search history.

(56) References Cited

U.S. PATENT DOCUMENTS

| 4,408,286 A | 10/1983 | Kikuchi et al. | |
|---|---|---|---|
| 5,880,956 A | 3/1999 | Graf | |
| 6,385,508 B1 * | 5/2002 | McGee | B25J 9/0081 |
| | | | 285/189 |
| 6,522,952 B1 * | 2/2003 | Arai | B25J 9/1612 |
| | | | 414/591 |
| 9,211,646 B2 * | 12/2015 | Tsusaka | B25J 13/08 |

(Continued)

FOREIGN PATENT DOCUMENTS

| CN | 1460052 A | 12/2003 |
|---|---|---|
| CN | 1676287 A | 10/2005 |

(Continued)

*Primary Examiner* — Bao Long T Nguyen
(74) *Attorney, Agent, or Firm* — Hauptman Ham, LLP

(57) ABSTRACT

A robot controller for easily moving a desired axis of a robot by applying a force to a front end of the robot, and a robot system including the robot controller. The robot controller has: a force measuring part which measures a force applied to the front end; an operation force calculating part which calculates an operation force for moving each axis based on the measured force; an operation commanding part which outputs a command for moving the robot; and an operation axis specifying part which specifies an operation axis to be moved in response to the force, and determines a direction of movement of the operation axis as a function of a direction of the force. When two or more operation axes are specified, the operation axis specifying part determines as to whether or not each operation axis can be moved, depending on a status of the movement operation.

10 Claims, 7 Drawing Sheets

(56) References Cited

U.S. PATENT DOCUMENTS

| | | |
|---|---|---|
| 2004/0034449 A1 | 2/2004 | Yokono et al. |
| 2004/0128030 A1* | 7/2004 | Nagata ................ B25J 9/1633 700/245 |
| 2005/0222714 A1 | 10/2005 | Nihei et al. |
| 2008/0140257 A1 | 6/2008 | Sato et al. |
| 2009/0259412 A1* | 10/2009 | Brogardh ............. B25J 9/1633 702/41 |
| 2010/0274388 A1 | 10/2010 | Hagenauer |
| 2010/0312392 A1 | 12/2010 | Zimmermann |
| 2011/0040411 A1* | 2/2011 | Murayama ............ B25J 5/02 700/260 |
| 2011/0190932 A1* | 8/2011 | Tsusaka ................ B25J 13/08 700/254 |
| 2011/0257787 A1 | 10/2011 | Sato et al. |
| 2013/0184871 A1* | 7/2013 | Fudaba ................. B25J 13/02 700/264 |
| 2014/0114479 A1* | 4/2014 | Okazaki ............... B25J 13/085 700/253 |
| 2015/0081098 A1* | 3/2015 | Kogan .................. B25J 9/1656 700/258 |
| 2015/0127151 A1* | 5/2015 | Riedel .................. B25J 9/1643 700/250 |
| 2015/0217445 A1* | 8/2015 | Hietmann ............. B25J 9/0081 700/264 |

FOREIGN PATENT DOCUMENTS

| | | |
|---|---|---|
| DE | 102007062108 A1 | 7/2009 |
| DE | 102009018403 A1 | 10/2010 |
| DE | 102010019640 A1 | 11/2011 |
| DE | 102010029745 A1 | 12/2011 |
| DE | 102012009010 A1 | 12/2012 |
| JP | 56-85106 A | 7/1981 |
| JP | 06-250728 A | 9/1994 |
| JP | 2008-142810 A | 6/2008 |

* cited by examiner

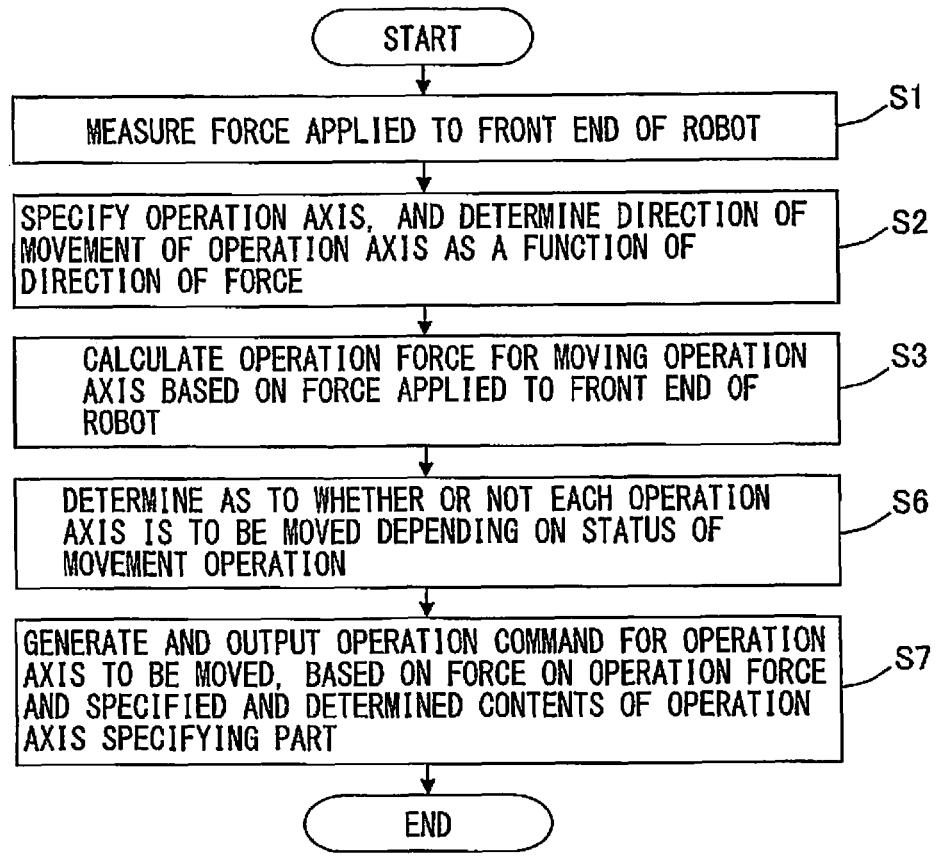
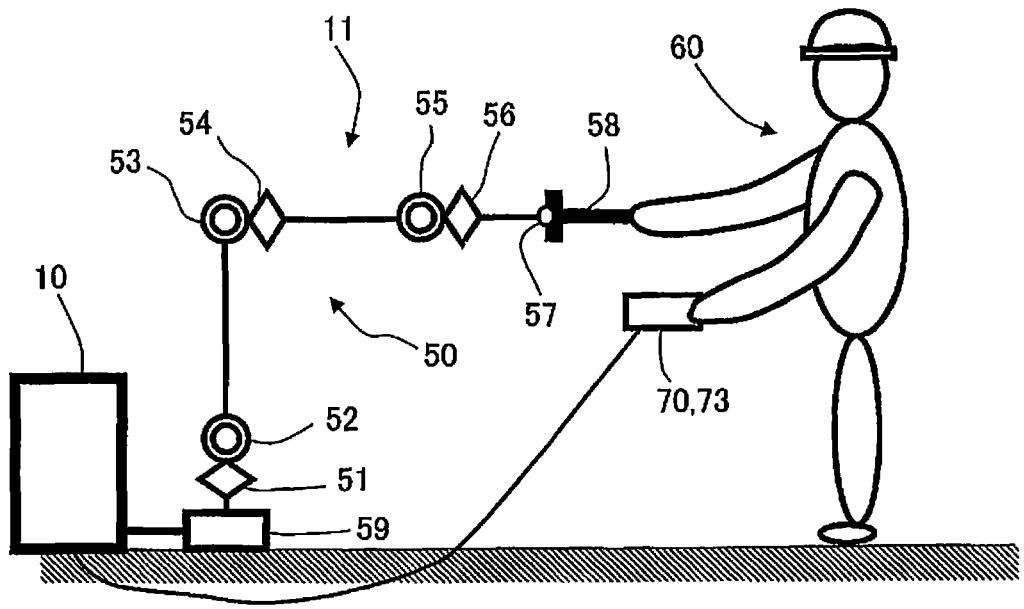

ROBOT CONTROLLER AND ROBOT SYSTEM FOR MOVING ROBOT IN RESPONSE TO FORCE

RELATED APPLICATIONS

The present application claims priority to Japanese Application Number 2014-082732, filed Apr. 14, 2014, the disclosure of which is hereby incorporated by reference herein in its entirety.

BACKGROUND OF THE INVENTION

1. Field of the Invention

The present invention relates to a robot controller for moving a robot based on a force applied to the robot, and relates to a robot system including the robot and the robot controller.

2. Description of the Related Art

As an operation method for moving a robot by applying a force to the robot, or a method for moving a robot by applying a force to the robot so as to teach a position, direct teaching is well known. In direct teaching, by directly guiding the robot by applying a force to the robot in a desired direction of movement, the robot can be moved to a desired position and/or orientation on an orthogonal coordinate system.

As relevant prior art documents, JP S56-085106 A discloses a method for moving the position and orientation of a front end of a robot arm, based on a signal generated by a force detector when a manual operation part attached to the front end of the robot arm is operated.

Further, JP H06-250728 A discloses a direct teaching device for a robot, wherein a force sensor arranged on the robot detects a force applied by a human to an end effector, and a robot arm is guided only in a direction determined by an operation direction setting means, when the motion of the robot arm is to be controlled based on a force signal obtained by the force sensor.

In the method of JP S56-085106 A, the position and/or orientation of the front end of the robot on the orthogonal coordinate system are moved in response to the force. However, in this method each axis cannot be moved to a desired position during the direct teaching.

In the device of JP H06-250728 A, when the robot is moved by direct teaching, the direction of movement of the robot is limited so as to move the robot only in the limited direction, and therefore operability of the robot may be improved. The limited direction relates to a direction regarding the position or orientation of the front end of the robot on a Cartesian coordinate system. Therefore, JP H06-250728 A does not describe a method regarding limiting an axis to be driven, wherein each axis is controlled so that only a desired axis is moved, etc.

SUMMARY OF THE INVENTION

Therefore, an object of the present invention is to provide: a robot controller capable of moving a front end of a robot to a position where the robot is difficult to be moved, when the position and/or orientation of the front end of the robot on the orthogonal coordinate system is changed by applying the force to the front end, and capable of moving the axis of the robot to a desired position without using a special input device and without carrying out input operation for switching a moving method; and a robot system including the robot controller and the robot.

According to one aspect of the present invention, a robot controller for moving a robot having a plurality of axes based on a force applied to the robot, the robot controller comprising: a force measuring part which measures a force applied to a front end of the robot; an operation force calculating part which calculates an operation force for performing movement operation regarding a position of each axis of the robot, based on the force measured by the force measuring part; an operation commanding part which outputs a command for moving the robot; and an operation axis specifying part which specifies an axis of the plurality of axes to be moved in response to the force as an operation axis, and determines a direction of movement of the operation axis as a function of a direction of the force, wherein, when two or more axes are specified as the operation axes, the operation axis specifying part determines as to whether or not each operation axis can be moved, based on the direction of the force measured by the force measuring part relative to the operation axis, depending on a status of the movement operation, and wherein the operation commanding part outputs an operation command for moving a position of the operation axis, based on the specified and determined contents by the operation axis specifying part and the operation force calculated by the operation force calculating part, is provided.

The present invention also provides a robot controller for moving a robot having a plurality of axes based on a force applied to the robot, the robot controller comprising: a force measuring part which measures a force applied to a front end of the robot; an operation force calculating part which calculates an operation force for performing movement operation regarding a position of each axis of the robot, based on the force measured by the force measuring part; an operation commanding part which outputs a command for moving the robot; and an operation axis specifying part which specifies an axis of the plurality of axes to be moved in response to the force as an operation axis, and determines a direction of movement of the operation axis as a function of a direction of the force, wherein, when two or more axes are specified as the operation axes, the operation axis specifying part determines as to whether or not each operation axis can be moved, based on a positional relationship between the operation axis and the front end of the robot, depending on a status of the movement operation, and wherein the operation commanding part outputs an operation command for moving a position of the operation axis, based on the specified and determined contents by the operation axis specifying part and the operation force calculated by the operation force calculating part.

Further, the present invention provides a robot controller for moving a robot having a plurality of axes based on a force applied to the robot, the robot controller comprising: a force measuring part which measures a force applied to a front end of the robot; an operation force calculating part which calculates an operation force for performing movement operation regarding a position of each axis of the robot, based on the force measured by the force measuring part; an operation commanding part which outputs a command for moving the robot; and an operation axis specifying part which specifies an axis of the plurality of axes to be moved in response to the force as an operation axis, and determines a direction of movement of the operation axis as a function of a direction of the force, wherein, when two or more axes are specified as the operation axes, the operation axis specifying part determines as to whether or not each operation axis can be moved, based on at least one of the direction of the force measured by the force measuring part relative to the operation axis and a positional relationship between the operation axis and the front end of the robot, and based on a predetermined priority order, depending on a status of the movement operation, and wherein the operation commanding part outputs an operation command for moving a position of the operation axis, based on the specified and determined contents by the operation axis specifying part and the operation force calculated by the operation force calculating part.

Further, the present invention provides a robot controller for moving a robot having a plurality of axes including two or more rotation axes, based on a force applied to the robot, the robot controller comprising: a force measuring part which measures a force applied to a front end of the robot; an operation force calculating part which calculates an operation force for performing movement operation regarding a position of each axis of the robot, based on the force measured by the force measuring part; an operation commanding part which outputs a command for moving the robot; and an operation axis specifying part which specifies an axis of the plurality of axes to be moved in response to the force as an operation axis, and determines a direction of movement of the operation axis as a function of a direction of the force, wherein the operation axis specifying part specifies two rotation axes of the plurality of axes as the operation axes, the two rotation axes having rotation centerlines which intersect at right angles regardless of the positions of the plurality of axes, and wherein the operation commanding part outputs an operation command for moving a position of the operation axis, based on the specified and determined contents by the operation axis specifying part and the operation force calculated by the operation force calculating part.

In a preferred embodiment, the operation axis specifying part specifies two rotation axes of the plurality of axes as the operation axes, the two rotation axes having rotation centerlines which intersect at right angles regardless of the positions of the plurality of axes, and determines as to whether or not each operation axis can be moved, based on at least one of the direction of the force measured by the force measuring part relative to the operation axis, a positional relationship between the operation axis and the front end of the robot, and a predetermined priority order, depending on a status of the movement operation.

According to another aspect of the present invention, a robot system comprising the robot and the robot controller is provided.

In a preferred embodiment, the robot system comprises a teaching operation device which inputs settings to the robot controller, wherein the operation axis specifying part specifies the operation axis based on input from the teaching operation device, and wherein the teaching operation device selects an option among options and inputs it, the options including combinations of the axes which are specified as the operation axes.

In a preferred embodiment, the robot system comprises a teaching operation device which inputs settings to the robot controller, wherein the operation axis specifying part specifies the operation axis based on input from the teaching operation device, and wherein the teaching operation device displays an axis capable of being selected as the operation axis, among the plurality of axes, and displays an axis other than the selected axis while representing at least one of: that the axis other than the selected axis can be simultaneously selected as the operation axis; and that the axis other than the selected axis cannot be simultaneously selected as the operation axis.

According to another aspect of the present invention, a robot system comprising the robot and the robot controller is provided, wherein the robot system comprises a display device, and the display device displays a specified condition by which the operation axis specifying part determines as to whether or not each operation axis can be moved.

In a preferred embodiment, the teaching operation device displays that the front end of the robot exists near the rotation centerline of the rotation axis or that the axes including the rotation axis cannot be specified as the operation axes, when a minimum distance between the front end of the robot and the rotation centerline of the rotation axis of the plurality of axes is equal to or smaller than a predetermined threshold, based on current positions of the axes of the robot.

BRIEF DESCRIPTION OF THE DRAWINGS

The above and other objects, features and advantages of the present invention will be made more apparent by the following description of the preferred embodiments thereof, with reference to the accompanying drawings, wherein:

FIGS. 9 and 10 are flowcharts showing examples of procedures executed by the robot controller according to the embodiment of the present invention;

FIGS. 11 and 12 show examples of attachment positions of a teaching operation device in the robot system including the robot controlled by the robot controller according to the embodiment of the present invention.

DETAILED DESCRIPTIONS

Figure 1:
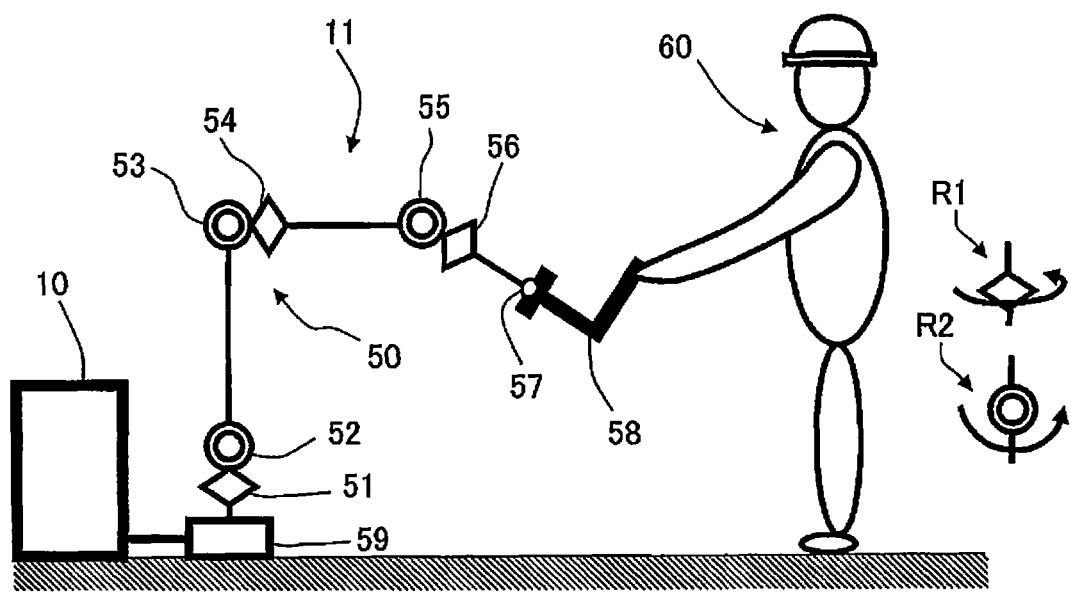
FIG. 1 shows a schematic configuration of a robot system including a robot controlled by a robot controller according to an embodiment of the present invention.

Hereinafter, an embodiment of the present invention will be explained with reference to the accompanying drawings. In the drawings, the same reference numerals are added to the similar components. In order to facilitate understanding of the invention, the scale in the drawings has been properly varied.

Herein, the term "force" includes a translational component and a moment component of the force, if not otherwise specified, and the term "position and/or orientation" includes at least one of the position and orientation. Further, the term "axis" means a joint portion for connecting links that constitute a robot, by which the positional and angular relationships between the links may be changed. For example, by changing the position of the axis (or the angle when the axis is a rotation axis), the positional relationship between the links can be changed, whereby the position and/or orientation of a front end of the robot can be changed.

In this regard, an actuator for moving the position the axis may be arranged on a portion other than the axis. Further, the term "force control gain" means a coefficient for determining an amount of movement, in force control for moving the robot in response to a force applied to the robot, based on the magnitude of the applied force. For example, the amount of movement may include the position and/or orientation of a front end of the robot on an orthogonal coordinate system at each control period, or the position of each axis of the robot at each control period.

Herein, a force "applied or acting about a rotation centerline of an axis of the robot" means a translational force along a plane or a moment of force about the rotation centerline of the rotation axis of the robot. In this regard, the plane is perpendicular to the rotation centerline of the axis on a coordinate system which is defined in relation to the rotation axis so that one axis of the coordinate system coincides with the rotation centerline, and the origin of the coordinate system corresponds to an intersection point between the plane and the rotation centerline.

FIG. 1 is a schematic view showing an example of configuration of a robot system 11 including a robot controller 10 according to an embodiment of the present invention and a robot 50 controlled by robot controller 10. Robot controller 10 is configured to control the position of each axis of robot 50 at each of predetermined control periods.

In robot system 11, when an operator 60 applies a force (external force) to a front end 58 of robot 50, robot controller 10 controls an actuator for moving each axis of robot 50 based on the force applied to front end 58 of robot 50 measured by a force measuring part 21 (FIG. 2), data which has been set, and position data of robot 50, etc., whereby the position of axis constituting robot 50 is changed and robot 50 is moved. Further, robot controller 10 has hardware including an arithmetic processing unit, a ROM and a RAM, etc., and executes various functions as explained below.

Hereinafter, the structure of robot 50 is concretely explained with reference to FIG. 1. Although robot 50 is a vertical multi-joint robot having six axes in the embodiment of FIG. 1, the present invention can also be applied to any conventional robot having the above structure, as long as the position of each axis can be controlled and the position of an intersection point where the axes intersect at right angles can be controlled. Further, although all of the six axes in FIG. 1 are rotation axes, the axes may include a linear axis.

Robot 50 has six axes, i.e., J1 axis 51, J2 axis 52, J3 axis 53, J4 axis 54, J5 axis 55 and J6 axis 56, in order of increasing a distance from pedestal 59 of robot 50. Each of J1 axis 51, J4 axis 54 and J6 axis 56 has a rotation axis R1 which rotates about a link connecting the axes (i.e., R1 is parallel to the drawing), and each of J2 axis 52, J3 axis 53 and J5 axis 55 has a rotation axis R2 which rotates about a direction perpendicular to the link connecting the axes (i.e., R2 is perpendicular to the drawing). In this regard, FIG. 1 is a simplified explanatory view for representing the structure of the axes of robot 50.

When an origin of each axis is defined as an origin of a coordinate system associated with the corresponding axis where the links are connected to each other, the position of the origin of each axis is represented as a position on a coordinate system specified in a space (hereinafter, also referred to as a reference coordinate system). In the structure of FIG. 1, the origins of J1 axis 51 and J2 axis 52 are at the same position, the origins of J3 axis 53 and J4 axis 54 are at the same position, and the origins of J5 axis 55 and J6 axis 56 are at the same position.

In the embodiment, regarding the expression "the position of the rotation axis is moved," the position of the axis means the rotation angle thereof and "is moved" means "is rotated." The "position of the origin of the axis" means the position of the origin of the coordinate system associates with each axis on the reference coordinate system specified in the space. The reference coordinate system means an orthogonal coordinate system fixed in a space, and is used to represent the position and/or orientation of front end 58 or a flange portion 57 (to which front end 58 is attached) of robot 50, or the position and/or orientation of a coordinate system associated with each axis, etc.

A tool coordinate system is specified in relation to robot 50 in order to represent the position and/or orientation of robot 50 on the reference coordinate system associated with the space. The origin of the tool coordinate system, corresponding to a point to be translated or a center point about which rotational movement is performed, is defined as a control point. Further, a coordinate system associated with the control point and parallel to the reference coordinate system is defined as a control coordinate system. In addition, the position of the control point may be arbitrarily determined as long as the control point is associated with robot 50.

Front end 58 of robot 50 is an article which is attached to a front side (or flange portion 57 of robot 50) of the axis farthest from pedestal 59 of robot 50 (in this case, J6 axis 56). A six-axis force sensor (not shown) is attached to front end 58 of robot 50. In robot controller 10, force measuring part 21 measures a force applied to front end 58 of robot 50 by the operator, based on outputs of the force sensor detected at specified time intervals.

Force measuring part 21 specifies a coordinate system having the origin positioned at a force measurement point on front end 58 of robot 50, and measures a translational component F and a moment component M of the force applied to front end 58 of robot 50 on the specified coordinate system. Hereinafter, this coordinate system is referred to as a force measurement coordinate system, and the origin of the force measurement coordinate system is referred to as a force measurement point. In this regard, the translational components of the force of X-, Y- and Z-axes on the coordinate system specified at front end 58 of robot 50 are represented by Fx, Fy and Fz, respectively, and the moment components of the force about the X-, Y- and Z-axes on the coordinate system are represented by Mx, My and Mz, respectively.

The force measurement point may be specified at an application point to which the operator applies the force, the origin of the sensor coordinate system associated with the force sensor, or a point on the axis of the sensor coordinate system, etc. Although the six components of the force are measured in the embodiment, only the translational component(s) F or only the moment component(s) M of the force may be measured. Further, the force sensor may be attached to any portion as long as the sensor can measure the force applied to front end 58 of robot 50. Instead of the six-axis force sensor, three-axis force sensor may be used, for example, as a means to measure the force applied to front end 58 of robot 50. Otherwise, instead of using the force sensor, the force applied to front end 58 of robot 50 may be estimated, by using a current value of the actuator for moving the axis constituting robot 50 may be used when the actuator is a motor, or a deviation between a command position and an actual position of the axis, or an output of a torque sensor attached to each axis, etc.

To front end 58 of robot 50, a tool for processing or conveying a workpiece or a maneuvering unit for operating or moving the robot in response to the force may be attached. For example, the maneuvering unit may be configured as a handle or a control bar capable of being gripped by operator 60, and may have a button, etc., for teaching the robot. When the force sensor is attached to front end 58 of robot 50, the tool or the maneuvering unit may be attached to the force sensor attached to robot 50. Otherwise, the force sensor may be attached to the tool attached to robot 50, and the maneuvering unit may be attached to the front side of the force sensor. When the force is to be applied to front end 58 of robot 50, the force may be applied to the tool attached to the force sensor without using the maneuvering unit, otherwise, the force may be applied to the maneuvering unit attached to the force sensor.

When the operator applies the force to the tool or the maneuvering unit attached to the force sensor so as to move robot 50, force measuring part 21 measures a net force applied to front end 58 of robot 50 by the operator, based on the force detected by the force sensor. In this regard, when an assembly of the force sensor and the maneuvering unit is attached to the tool attached to front end 58 of robot 50, the force sensor is less affected by a gravity force or an inertia force of a portion attached to the force sensor, whereby an error in calculating or determining the net force may be smaller.

In order that the assembly of the force sensor and the maneuvering unit is easily detached from the tool, the assembly may be attached to the tool by using a mechanism constituted by a magnet or a spring, etc. By virtue of this, the assembly for detecting the force may be attached to the robot only when robot 50 is to be moved or operated in response to the force. Therefore, the assembly may be detached when teaching operation is not necessary, or the assembly may be used in another robot system as needed.

Figure 2:
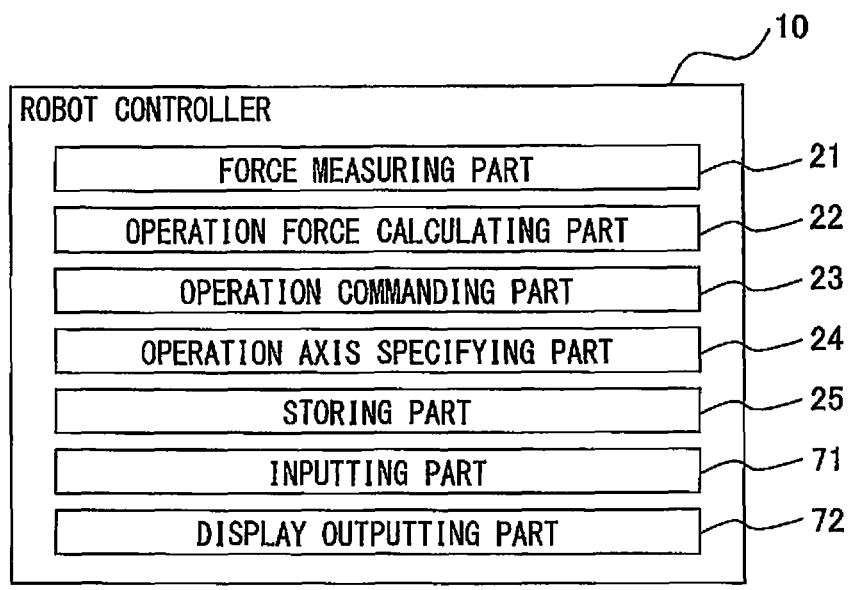
FIG. 2 is a functional block diagram showing a configuration of the robot controller according to the embodiment of the present invention.

FIG. 2 is a functional diagram of an example of the configuration of robot controller 10 according a first embodiment of the present invention. As shown, robot controller 10 has a force measuring part 21, an operation force calculating part 22, an operation commanding part 23, an operation axis specifying part 24, a storing part 25, an inputting part 71 and a display outputting part 72.

Force measuring part 21 measures a net force applied to front end 58 of robot 50 by the operator. In this regard, force measuring part 21 compensates for the affect on the force detected by the force sensor due to the gravity or inertia force (including the Coriolis force and gyro effect) of an article such as the tool and the maneuvering unit attached to the force sensor or the gripped workpiece, so as to determine the net force applied to front end 58 of robot 50 by the operator. The affect of the gravity or the inertia force by the article attached to the force sensor may be compensated for by a conventional method. For example, the mass and the gravity center of the article attached to the force sensor may be previously calculated before the operator applies the force to the robot, and the force may be corrected by using a method as disclosed in JP 2008-142810 A, with reference to the calculated mass and gravity center of the article and the motion of the robot.

Operation force calculating part 22 calculates an operation force for moving the position and/or orientation of each axis of robot 50, based on the force including the translational component and/or the moment component of the force applied to front end 58 of robot 50. For example, when the axis to be moved is a rotation axis, as in the first embodiment, operation force calculating part 22 calculates the operation force as described below.

The operation force may be calculated based on the net force (a measured value) actually applied to front end 58 of robot 50 measured by force measuring part 21. Otherwise, the operation force may be calculated as a virtual force virtually applied to the axis to be moved, based on the force applied to front end 58 of robot 50. Concretely, when the translational force applied to front end 58 of robot 50 is projected on a plane perpendicular to the rotation centerline of the axis to be moved, the direction of the operation force for moving the axis may be determined based on as to which rotational direction (plus or minus) the projected translational force is oriented (in other words, based on the translational direction of the force applied about the rotation centerline of the axis). Further, the magnitude of the operation force may be determined based on the magnitude of the translational force measured by force measuring force, or the magnitude of the projected force, or the magnitude of a component the projected force perpendicular to a position vector from the rotation centerline to a point of application of the projected force.

Alternatively, the operation force may be determined by calculating a moment of the force about the rotation centerline of the axis to be moved, based on the force applied to front end 58 of robot 50 measured by force measuring part 21. In addition, the operation force may be determined by calculating a moment of the force about the rotation centerline of the axis to be moved, while properly modifying a method of calculating a force vector and/or a position vector so as to improve the operability, based on the force applied to front end 58 of robot 50 measured by force measuring part 21.

The direction of the operation force for moving the axis may be determined based on a sign (plus or minus) of the moment of the force applied about the rotation centerline of the axis, and the magnitude of a proper operation force in response to the operation may be determined based on the magnitude of the force measured by force measuring part 21. In this regard, it is sufficient that the direction of the operation force is specified as merely forward or backward (such as plus or minus), so that the direction of movement of the axis to be moved can be determined. Further, in order to improve the operability of the robot when moving the robot in response to the force, it is preferable that the operation force be adjusted in view of the direction and velocity of movement of the robot during being operated, as needed. Although the embodiment indicates the case in which the axis to be moved is a rotation axis, a translational component of an axial force is calculated when the axis to be moved is a linear axis.

Operation axis specifying part 24 specifies the operation axis as the axis to be moved in response to the force, among the plurality of axes (i.e., J1 axis 51 to J6 axis 56), and specifies the direction of movement of the operation axis as a function of the direction of the force. Further, when two or more operation axes are specified, operation axis specifying part 24 specifies as to whether or not each operation axis is to be moved (i.e., selects an operation axis to be moved and an operation axis not to be moved), depending on a status of the movement operation.

The axis to be moved in response to the force (or the operation axis) may be selected based on input from the operator, or on the current position of each axis robot 50. The direction of movement of the operation axis as a function of the direction of the force may be determined based on a predetermined value, or on the current position of each axis robot 50 and/or the force applied to front end 58 or robot 50 during the movement operation. In case two or more operation axes are specified, when specifying as to whether or not each operation axis is to be moved (i.e., when selecting an operation axis to be moved from the plurality of operation axes) depending on a status of the movement operation, the direction of the force relative to the operation axis measured by force measuring part 21, the positional relationship between the operation axis and front end 58 of robot 50, and/or a predetermined priority order, etc., are used.

Operation commanding part 23 outputs a command for moving robot 50 in response to the force applied to front end 58 of robot 50, by using the specified or determined contents of operation axis specifying part 24 and the operation force calculated by force calculating part 22 based on the force measured by force measuring part 21. When two or more operation axes are specified, operation commanding part 23 determines as to which operation axis is to be moved and outputs an operation command for moving the operation axis depending on the status of the movement operation, based on the specified or determined contents of operation axis specifying part 24. When the operation command is generated based on the operation force, the velocity of movement in relation to the operation force may be determined by a force control gain. Further, it is preferable that the velocity of movement be adjusted as needed. For example, responsiveness of the velocity against the operation force may be lowered, or the velocity may be accelerated or decelerated, depending on a status of the movement operation of robot 50.

Storing part 25 stores parameters necessary for various calculations, such as a parameter required by force measuring part 21 for measuring the force, a parameter required by operation force calculating part 22 for calculating the operation force, and a parameter required by operation axis specifying part 24 for specifying the operation axis, etc., and storing part 26 also stores results of the specification or determination.

Inputting part 71 receives and processes data which is input to robot controller 10, the data including data which is transferred from an input device connected to robot controller 10 and capable of inputting various settings, and setting data which is input to another controller or a computer and transferred to robot controller 10 via a network, etc.

Display outputting part 72 performs a process for displaying and outputting: information required for inputting various settings; the operation axis specified by operation axis specifying part 24; the direction of movement of the operation axis as a function of the direction of the force; and the determination as to whether or not each operation axis is to be moved, etc.

Figure 3:
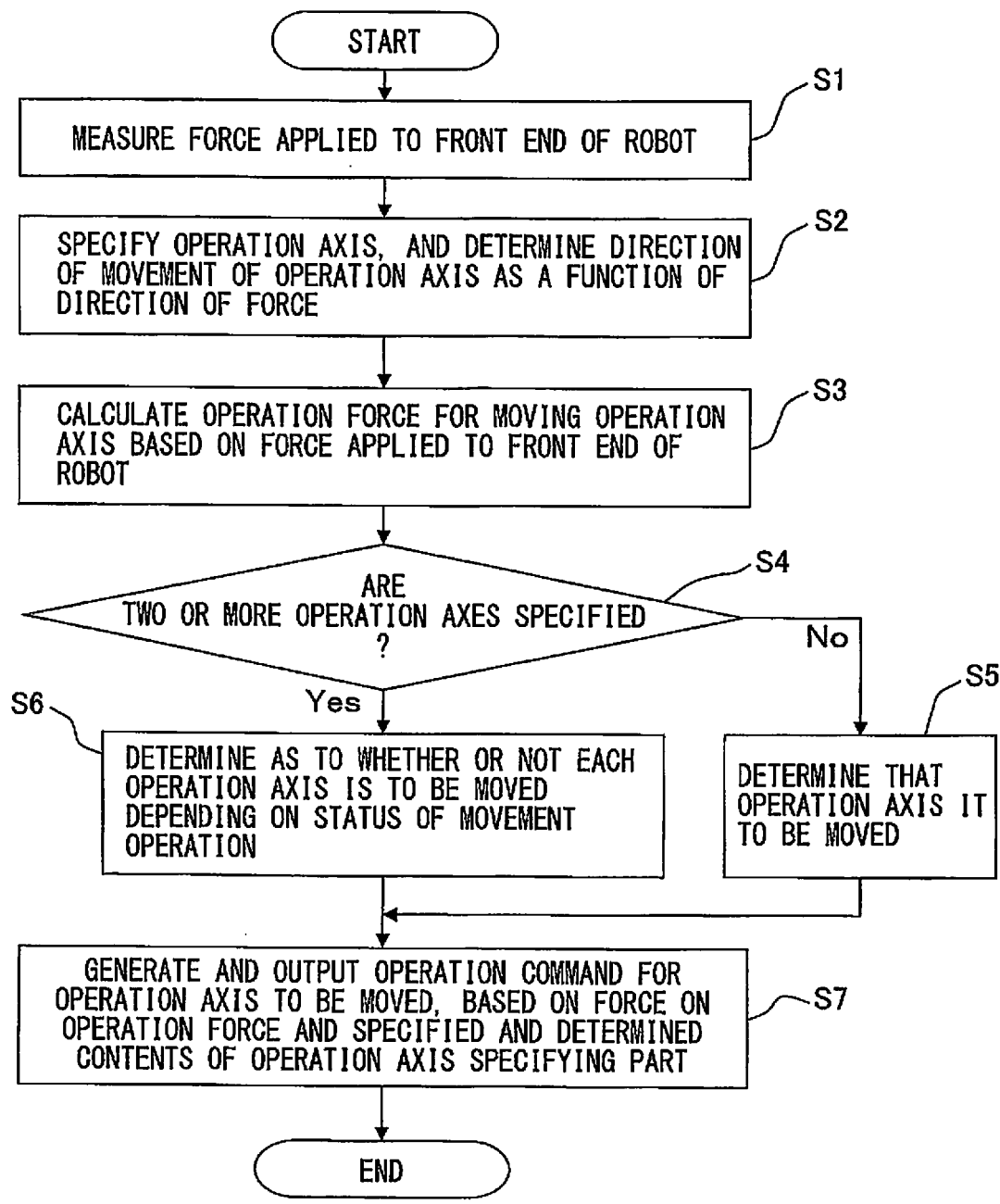
FIG. 3 is a flowchart showing an example of a procedure executed by the robot controller according to the embodiment of the present invention.

Hereinafter, with reference to FIG. 3, an example of a procedure executed by robot controller 10 according to the first embodiment of the present invention, wherein robot 50 is moved by applying the force to front end 58 of robot 50 by the operator, will be explained. FIG. 3 is a flowchart showing the example of the procedure executed by robot controller 10.

When the process for moving robot 50 is initiated and an external force is applied to front end 58 of robot 50 by operator 60, etc., force measuring part 21 measures the force applied to front end 58 (step S1). Then, operation axis specifying part 24 specifies the operation axis to be moved in response to the force, and determines the direction of movement of the operation axis as a function of the direction of the force (step S2).

Next, operation force calculating part 22 calculates the operation force for moving the position of the operation axis specified by operation axis specifying part 24, based on the force applied to front end 58 of robot 50 measured by force measuring part 21 (step S3). Then, operation axis specifying part 24 judges as to whether two or more operation axes are specified (step S4). This judgment is used to determine as to whether or not each of the operation axes is to be moved, depending on the status of the movement operation. When two or more operation axes are specified, the procedure progresses to step S6, otherwise, progresses to step S5.

When one operation axis is specified, operation axis specifying part 24 specifies the operation axis as "an axis to be moved" (step S5). On the other hand, when two or more operation axes are specified, operation axis specifying part 24 specifies as to whether or not each operation axis is to be moved, depending on the status of the movement operation (step S6). In other words, when the plurality of axes are specified as the operation axes to be moved in response to the force, it is determined as to whether or not each operation axis can be moved, depending on the status of the movement operation, in order to move a desired axis. Then, operation commanding part 23 generates and outputs an operation command for moving the position of the operation axis, based on the operation force calculated by operation force calculating part 22 and the specified and determined contents of operation axis specifying part 24 (step S7).

In this regard, several examples of the process in step S3, in which operation force calculating part 23 calculates the operation force for moving the position of the operation axis, will be explained. The calculation process may be different for each axis, and may be different depending on the status of the movement operation.

Figure 4:
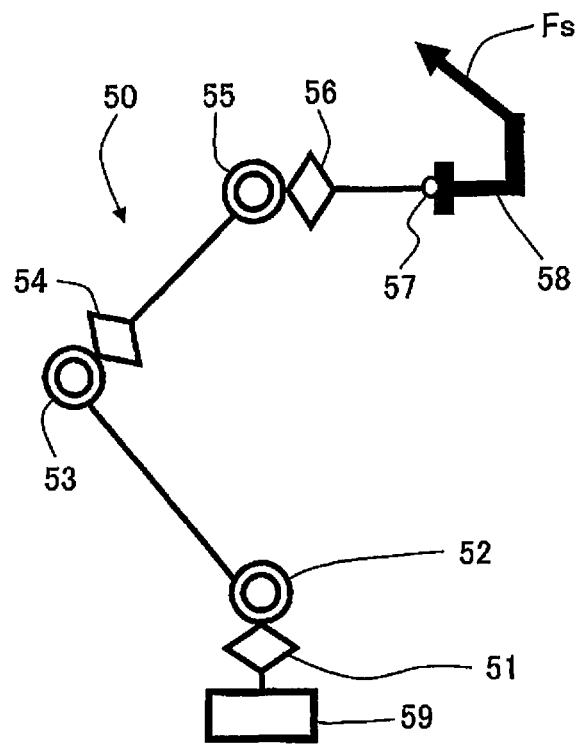
FIGS. 4 and 5 show examples for calculating an operation force by an operation calculating part.

FIG. 4 shows that force Fs measured by force measuring part 21 is applied to front end 58 of robot 50. Force Fs includes a translational force component F and a force moment component M, and is constituted by translational force components Fx, Fy and Fz, and force moment components Mx, My and Mz. In a coordinate system defined in relation to the operation axis, the rotation centerline of the operation axis coincides with a Z-axis of the coordinate system. By converting force Fs measured by force measuring part 21 to a force on the coordinate system associated with the operation axis, a force moment about the Z-axis of the converted or calculated force may be determined as the operation force.

Figure 5:
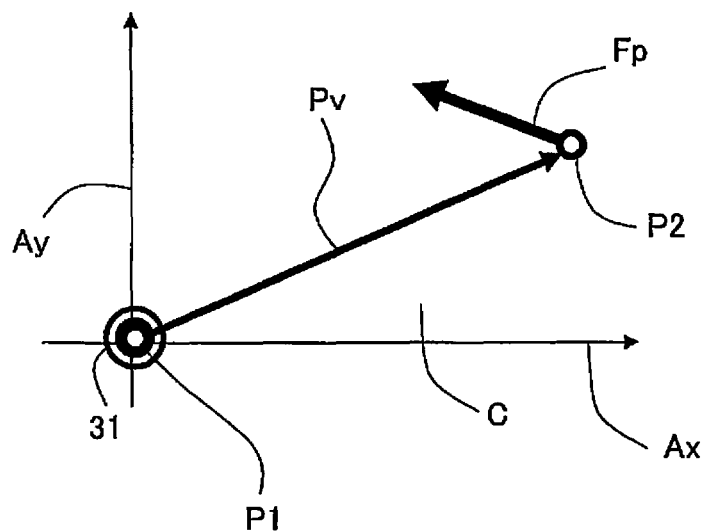

Alternatively, the operation may be calculated as follows. FIG. 5 shows that one of the axes constituting robot 50 of FIG. 4 is specified as an operation axis 31, and explains a method for calculating the operation force in relation to operation axis 31 by using operation force calculating part 22, based on force Fs measured by force measuring part 21. First, a coordinate system, constituted by a point P1, an X-axis Ax, a Y-axis Ay and a Z-axis Az, is defined in relation to operation axis 31. In this regard, point P1, representing the position of operation axis 31 on the reference coordinate system, is determined as the origin of the specified coordinate system. Further, Z-axis Az coincides with the rotation centerline of operation axis 31, and a plane C constituted by X-axis Ax and Y-axis Ay is perpendicular to the rotation centerline of the operation axis. Plane C (or the X-Y plane) is constituted by X-axis Ax and Y-axis Ay of the coordinate system specified in relation to operation axis 31.

Further, a force measurement point, which corresponds to the origin of a force measurement coordinate system used to measure the force applied to front end 58 of robot 50, is projected on plane C, and the projected point is determined as a point P2. In this regard, a force moment on plane C, converted from moment component M (Mx, My, Mz) of force Fs measured by force measuring part 21, may be determined as force moment M21. Alternatively, a force moment about Z-axis Az on the coordinate system associated with operation axis 31, converted from moment component M (Mx, My, Mz) of force Fs measured by force measuring part 21, may be determined as force moment M21.

A position vector from point P1 to point P2 is defined as position vector Pv. The magnitude of position vector Pv corresponds to a minimum distance between the rotation centerline of the operation axis and the force measurement point. A force applied about the rotation centerline of the operation axis on plane C, which is calculated based on translational force component F (Fx, Fy, Fz) of force Fs measured by force measuring part 21, may be defined as a force Fp. Alternatively, a translational force component, obtained by projecting translational force component F on plane C, may be defined as force Fp. When force Fp is calculated based on translational force component F of force Fs, force Fp may be calculated based on the direction of translational force component F and the rotational operation in a predetermined direction. In addition, when force Fp on plane C is calculated, a change in the magnitude of force Fp due to a change in translational force component F of force Fs may be reduced.

Next, the operation force is calculated based on force moment M21, or a force moment M11 which corresponds to an outer product of force Fp on plane C and position vector Pv. Concretely, when the magnitude of position vector Pv is smaller than a predetermined threshold, force moment M21 is determined as the operation force. On the other hand, when the magnitude of position vector Pv is equal to or larger than the predetermined threshold, force moment M11 is calculated as the outer product of force Fp and position vector Pv, and calculated force moment M11 is determined as the operation force. Alternatively, a force moment obtained as a summation of force moments M11 and M21 may be determined as the force operation. In this regard, in calculating the summation of force moments M11 and M21, weighting coefficients may be multiplied by the respective force moments, in view of influences of the respective force moments. Further, the weighting coefficients may be adjusted based on the magnitudes of position vector Pv and force Fp.

When the influence of force moment component M of force Fs measured by force measuring part 21 should be eliminated, or when the operation axis should be moved based on the translational force component of force Fs only, it is preferable that only force moment M11 be determined as the operation force, without considering force moment M21. Even when the magnitude of force Fp is not changed, the magnitude of force moment M11 may be changed depending on the magnitude of position vector Pv. Therefore, unlike force moment M21, the magnitude of force moment M11 is changed due to the movement of front end 58 of robot 50, whereby the operation force is also changed. Accordingly, when the magnitude of position vector Pv is equal to or larger than a predetermined threshold and the magnitude of force Fp is smaller than a predetermined threshold, it may be preferable that only force moment M21 be determined as the operation force.

As explained above, the virtual force applied to operation axis 31 is calculated as the operation force, based on force moment M11 (calculated by position vector Pv on plane C and force Fp on plane C based on translational force component F of force Fs measured by force measuring part 21) and/or force moment M21 (calculated by force moment component M of force Fs measured by force measuring part 21). When calculating force moment M11, force Fp may be calculated so that the magnitude of force Fp is not changed as possible due to a change in the direction of force F; a representative translational force may be determined based on the direction of force Fp; and/or a representative position vector may be determined based on the magnitude of position vector Pv. By virtue of this, the fluctuation of the operation force during the movement operation may be reduced, robot 50 may be stably moved, and the operability of the robot may be improved. In this regard, it is preferable that the direction and magnitude of force Fp and/or the magnitude of position vector Pv be changed so that the calculated operation force is gradually changed (i.e., the robot may be smoothly moved).

Next, another method for calculating the operation force is explained. An angle formed by position vector Pv and force Fp is calculated, and it is judged as to whether a sign of the force moment calculated by position vector Pv and force Fp is plus or minus. Then, it is determined as to which direction (plus or minus) the position of operation axis 31 should be moved in, and a sign of the operation force is determined. The magnitude of the operation force corresponds to the magnitude of force Fp or the magnitude of translational force component F of force Fs. The operation force may be calculated as such. In this regard, when the magnitude of position vector Pv is relatively small, force moment M21 is used. Alternatively, the operation force is calculated as a summation of a first value and a second value, wherein the first value is obtained by multiplying a coefficient by the force calculated based on the sign and the magnitude as explained above, and the second value is obtained by multiplying another coefficient by force moment M21.

Next, the process of operation axis specifying part 24 of robot controller 10 according to the first embodiment of the invention will be explained in detail. Operation axis specifying part 24 specifies an axis to be moved in response to the force, among the plurality of axes, as the operation axis, and determines the direction of movement of the operation axis as a function of the direction of the force. Further, operation axis specifying part 24 judges and determines as to whether or not the specified operation axis can be moved, depending on the status of the movement operation. In step S6, operation axis specifying part 24 determines as to whether or not the specified operation axis can be moved, based on the direction of the force measured by force measuring part 21, depending on the status of the movement operation. These processes will be explained with reference to FIGS. 4 to 6.

Operation axis specifying part 24 specifies the operation axis, among the plurality of axes constituting robot 50, based on input, setting and current positions of the axes of robot 50. For example, in case that two or more axes are specified as the operation axes, the plurality of axes may be simultaneously moved when the operation axes are to be moved based on the operation force calculated by operation force calculating part 22, depending on the direction of the force applied to front end 58 of robot 50. In order to move a desired axis or an axis which satisfies a predetermined condition, or in order to not move another axis which satisfies another condition, a movable operation axis and an immovable operation axis are specified, based on the direction of the force applied to the operation force measured by force measuring part 21, depending on the status of the movement operation. In this regard, the "movable operation axis" means an operation axis which is allowed to be moved (or can be moved) in response to the force, and the "immovable operation axis" means an operation axis which is not allowed to be moved (or cannot be moved) even when the force is applied thereto.

Any method may be used as the method for determining the operation as the movable operation axis or the immovable operation axis, based on the direction of the force applied to the operation axis measured by force measuring part 21, as long as the method is capable of determining as to whether or not the operation axis can be moved, by comparing a value calculated by the direction of the force measured by force measuring part 21 to a predetermined threshold, or to another value calculated in relation to another operation axis in the same way.

Hereinafter, several examples of the method for determining or judging as to whether or not the operation axis can be moved, based on the direction of the force applied to the operation axis measured by force measuring part 21, will be explained. The determination, as to whether or not each operation can be moved when the force is applied to front end 58 of robot 50, may be performed based on as to whether or not the magnitude of the operation force of each operation axis calculated by operation force calculating part 22 is larger than a predetermined threshold. When the plurality of operation axes are specified as the movable operation axes as such, the other axis may be determined as the immovable operation axis.

In determining or judging as to whether or not each operation axis can be moved, when the plurality of operation axes simultaneously satisfy a condition for the movable operation axis, but the movable operation axes should be limited among them, a plurality of judging methods may be compatibly combined so as to limit the number of the movable operation axes. For example, the judging methods may include a method for determining a priority order of the axes, and a method for selecting another operation axis, etc. Further, in determining or judging as to whether each operation axis corresponds to the movable operation axis or the immovable operation axis, a priority order may be predetermined in relation to all of the operation axes, and the determination or judgment may be sequentially performed in relation to all of the operation axes according to the priority order. In this case, when one operation axis is determined or judged as the movable operation axis, the remaining operation axes may be determined as the immovable operation axis.

As explained above, FIG. 4 shows that force Fs applied to front end 58 of robot 50 is measured by force measuring part 21. In an example of the method for judging as whether or not the operation axis can be moved, an operation axis among the operation axes, in which the direction of translation force component F of force Fs applied to front end 58 of robot 50 measured by force measuring part 21 and the rotation centerline of the operation axis are most closely parallel to other, is determined as the immovable operation axis.

Alternatively, an operation axis among the operation axes, in which an angle between the direction of force F and the rotation centerline of the operation axis is within a predetermined range centering about zero degree, may be determined as the immovable operation axis.

Alternatively, as shown in FIG. 5, an operation axis among the operation axes, in which an angle between the direction of force FP on plane C calculated when determining the operation force applied to operation axis 31 and the direction of position vector Pv is within a predetermined range centering about 90 degrees, may be determined as the immovable operation axis.

Alternatively, an operation axis among the operation axes, in which the direction of force Fp on plane C and the direction of position vector Pv are most closely perpendicular to other, may be determined as the immovable operation axis.

Figure 6:
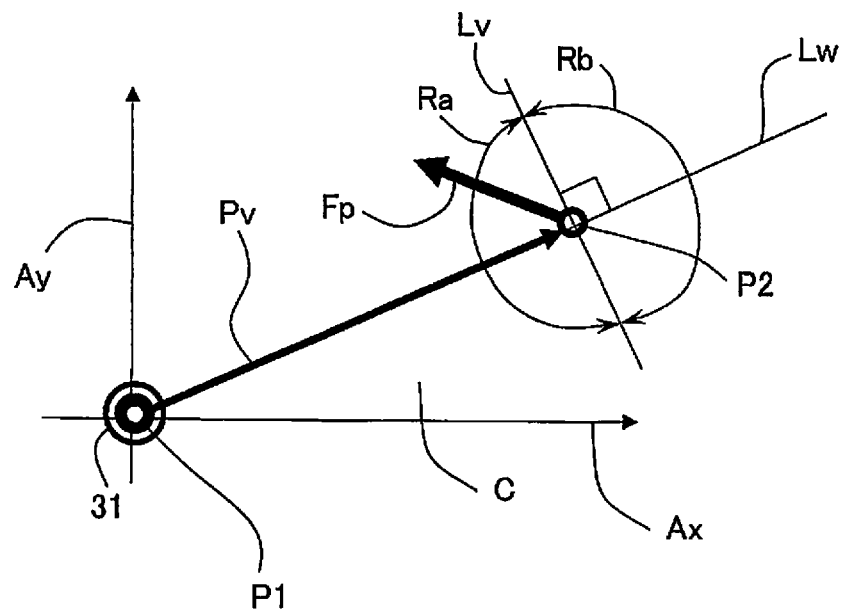
FIGS. 6 to 8 show examples for judging and specifying as to whether an operation axis is specified as a movable or immovable axis.

Another method is explained with reference to FIG. 6. FIG. 6 explains another method for judging as to whether the operation axis is specified as the movable operation axis or the immovable operation axis, based on the direction of force Fp. In FIG. 6, straight lines Lw and Lv, and ranges Ra and Rb are added to FIG. 5. Straight line Lw extends on plane C and includes points P1 and P2. Straight line Lv extends on plane C and intersects with straight line Lw at right angles at point P2. Based on an angle between force Fp and straight line Lw, it is judged as to whether the direction of force Fp is within a predetermined range Ra on plane C where point P1 exists in relation to straight line Lv, or within a predetermined range Rb other than range Ra (where point P1 does not exist). Then, it is determined as to whether the operation axis corresponds to the movable operation axis or the immovable operation axis, depending on the direction of force Fp. However, when an angle between the direction of force Fp and position vector Pv or straight line Lw is within a predetermined range centering about zero degree, the operation axis is specified as the immovable operation axis. In other words, the direction of force Fp is nearly parallel to the direction of position vector Pv or straight line Lw, the operation axis is specified as the immovable operation axis. By using this method, when force Fp in relation to one operation axis is within range Ra, the operation axis may be specified as the movable operation axis. On the other hand, when force Fp in relation to another operation axis is within range Rb, the operation axis may be specified as the movable operation axis.

Figure 7:
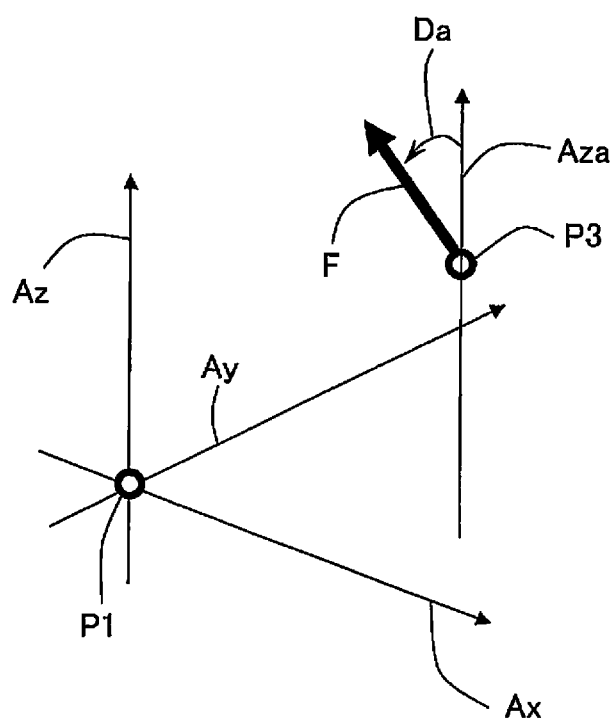

Another method is explained with reference to FIG. 7. FIG. 7 explains another method for judging as to whether the operation axis is specified as the movable operation axis or the immovable operation axis, based on an angle between the direction of force component F of force Fs measured by force measuring part 21 and the rotation centerline of the operation axis. A detailed explanation of the components having the same reference numerals as the other case will be omitted. FIG. 7 shows force F on a coordinate system which is defined in relation to operation axis 31 so that the rotation centerline of operation axis 31 coincides with Z-axis Az. Force F is applied to force measurement point P3. Z-axis Az is translated to an axis Aza, on which point P3 exists.

An angle Da between axis Aza and the direction of force F is calculated, and it is judged as to whether angle Da is within a range from zero to 90 degrees, or within a range from 90 to 180 degrees. Based on the range in which angle Da is included, the direction of force F relative to the rotation centerline of the operation axis is calculated, and it is determined as to whether the operation axis is specified as the movable operation axis or the immovable operation axis. By using this method, when angle Da calculated in relation to one operation axis is within the range from zero to 90 degrees, the operation axis may be specified as the movable operation axis. On the other hand, when angle Da calculated in relation to another operation axis is within the range from 90 to 180 degrees, the operation axis may be specified as the movable operation axis.

By using one of the above methods or a combination thereof, the operation axis may be specified as the movable operation axis or the immovable operation axis, based on the direction of the force measured by force measuring part 21, depending on the status of the movement operation.

A method for generating and outputting the operation command for moving the position of the operation axis by means of operation commanding part 23 in step S7 will be explained. Operation commanding part 23 moves the movable operation axis based on the operation force calculated by operation force calculating part 22 and the direction of movement as a function of the direction of the force specified by operation axis specifying part 24. In this case, operation commanding part 23 determines a target direction of movement (the rotational direction in the rotation axis) based on the direction of the force specified by operation axis specifying part 24 (in this case, the direction of movement of the operation axis depending on the sign of the operation force), and calculates a target velocity of movement of the operation axis based on the magnitude of the operation force.

In this regard, it is preferable that the target velocity of movement of the operation axis be calculated based on force control in which the magnitude of the operation force is multiplied by a force control gain for determining responsiveness of the movement relative to the force. Further, the force control gain may be changed depending on a minimum distance between the rotation centerline of the operation axis and front end 58 of robot 50. By virtue of this, the responsiveness relative to the operation force may be changed depending on the position of front end 58 of robot 50, and the velocity of movement of robot 50 may be adjusted in each region in the space.

In either case that the minimum distance between the rotation centerline of the operation axis and front end 58 of robot 50 is relatively long or short, when the operation axis is moved at the same angular velocity in the same operation force, the velocity in the translational direction of front end 58 of robot 50 when the minimum distance is long is larger than when the minimum distance is short. Therefore, when the angular velocity of the operation axis when the minimum distance is long, is smaller than when the minimum distance is short, robot 50 may be safely moved and easily operated.

Therefore, as the minimum distance between the rotation centerline of the operation axis and front end 58 of robot 50 increases, the force control gain may be smaller based on the minimum distance. By virtue of this, even when the magnitude of the operation force is not changed, the velocity of front end 58 of robot 50 can be lowered as front end 58 of robot 50 is away from the operation axis, whereby safety and operability of robot 50 can be improved.

When the target velocity of the operation axis is to be changed depending on the magnitude of the operation force, the tangential velocity of front end 58 of robot 50 increases as front end 58 of robot 50 is away from the operation axis, even when the magnitude of the operation force is not changed. Therefore, when the movable operation axis is to be moved based on the operation force as calculated above and the direction of movement as a function of the direction of the force specified by operation axis specifying part 24, operation commanding part 23 ay calculate a target direction of movement and a target tangential velocity of front end 58 or robot 50 about the rotation centerline of the movable operation axis based on the operation force, and may move the movable operation axis based on a target direction of movement and a tangential velocity of the operation axis calculated by the target direction of movement and the target tangential velocity of front end 58 or robot 50.

By virtue of this, when the magnitude of the operation force is not changed, the tangential velocity of front end 58 or robot 50 may be constant regardless of the position of front end 58. In this case, even when the magnitude of the operation force is not changed, the rotational velocity of the operation axis is lowered as front end 5B of robot 50 is away from the operation axis. In order to obtain such effect, when the target velocity of movement of the operation axis is calculated based on the magnitude of the operation force, the magnitude of operation force may be divided by the minimum distance between the rotation centerline of the operation axis and front end 58 of robot 50. Further, when the target direction of movement and the target velocity of the operation axis is calculated based on the magnitude of the operation force after calculating the direction of movement and the tangential velocity of front end 58 of robot 50 about the rotation centerline of the operation axis based on the operation force, the target tangential velocity of front end 58 of robot 50 may be calculated by force control in which the magnitude of the operation force is multiplied by a force control gain for determining responsiveness of the movement relative to the force so as to calculate an amount of movement of front end 58 of robot 50. As described above, operation commanding part 23 generates and outputs the command for moving the position of the movable operation axis, based on the operation force calculated by operation force calculating part 22 and the direction of movement as a function of the direction of the force specified by operation axis specifying part 24, and based on the specified and determined contents of operation axis specifying part 24.

Next, a robot controller according to a second embodiment of the invention will be explained. In the robot controller of the second embodiment, only step S6, for specifying as to whether or not the operation axis can be moved by using operation axis specifying part 24, is different from robot controller 10 of the first embodiment, and the other steps may be the same as in the first embodiment. Therefore, a detail explanation of the second embodiment will be omitted in relation to the disclosure of FIGS. 2 and 3 similar to the first embodiment. In other words, in the second embodiment, the method by operation axis specifying part 24 is to specify as to whether or not the operation axis can be moved, depending on the status of the movement operation, and thus a basic concept of the method is common to the first embodiment.

In the second embodiment, operation axis specifying part 24 specifies the operation axis among the plurality of axes, which is to be moved in response to the force, and determines the direction of movement of the operation axis as a function of the direction of the force. Further, operation axis specifying part 24 determines as to whether or not the operation axis can be moved, depending on the status of the movement operation. In the second embodiment, in step S6, operation axis specifying part 24 specifies as to whether or not each operation axis can be moved, based on the positional relationship between the operation axis and front end 58 of robot 50, depending on the status of the movement operation.

The process of operation axis specifying part 24 of the robot controller according to the second embodiment of the invention will be explained in detail. First, operation axis specifying part 24 specifies the operation axis, among the plurality of axes constituting robot 50, based on input, setting and current positions of the axes of robot 50. In the second embodiment, two or more axes are specified as the operation axes.

When the two or more axes are specified as the operation axes, the plurality of axes may be simultaneously moved when the operation axes are to be moved based on the operation force calculated by operation force calculating part 22, depending on the direction of the force applied to front end 58 of robot 50. In order to move a desired axis or an axis which satisfies a predetermined condition, or in order to not move another axis which satisfies another condition, a movable operation axis and an immovable operation axis are specified, based on the positional relationship between the operation axis and front end 58 of robot 50, depending on the status of the movement operation. In this regard, the "movable operation axis" means an operation axis which is allowed to be moved (or can be moved) in response to the force, and the "immovable operation axis" means an operation axis which is not allowed to be moved (or cannot be moved) even when the force is applied thereto.

Any method may be used as the method for determining the operation as the movable operation axis or the immovable operation axis, based on the positional relationship between the operation axis and front end 58 of robot 50, as long as the method is capable of determining as to whether or not the operation axis can be moved, by comparing a value calculated based on the positional relationship between the operation axis and front end 58 of robot 50 to a predetermined threshold, or to another value calculated in relation to another operation axis in the same way.

The determination, as to whether or not each operation can be moved when the force is applied to front end 58 of robot 50, may be performed based on as to whether or not the magnitude of the operation force of each operation axis calculated by operation force calculating part 22 is larger than a predetermined threshold. When the plurality of operation axes are specified as the movable operation axes as such, the other axis may be determined as the immovable operation axis.

In determining or judging as to whether or not each operation axis can be moved, when the plurality of operation axes simultaneously satisfy a condition for the movable operation axis, but the movable operation axes should be limited among them, a plurality of judging methods may be compatibly combined so as to limit the number of the movable operation axes. For example, the judging methods may include a method for determining a priority order of the axes, and a method for selecting another operation axis, etc. Further, in determining or judging as to whether each operation axis corresponds to the movable operation axis or the immovable operation axis, a priority order may be predetermined in relation to all of the operation axes, and the determination or judgment may be sequentially performed in relation to all of the operation axes according to the priority order. In this case, when one operation axis is determined or judged as the movable operation axis, the remaining operation axes may be determined as the immovable operation axis.

Figure 8:
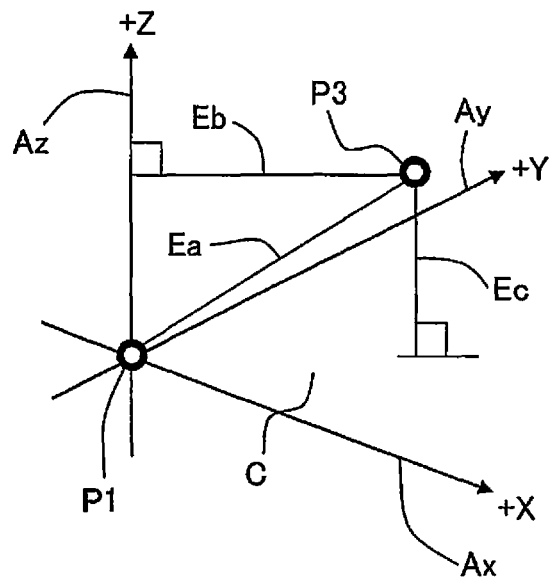

The method for determining the operation as the movable operation axis or the immovable operation axis, based on the positional relationship between the operation axis and front end 58 of robot 50, will be explained with reference to FIG. 8. FIG. 8 shows a coordinate system specified in relation to one operation axis, similarly to the above embodiment. First, a coordinate system, constituted by a point P1, an X-axis Ax, a Y-axis Ay and a Z-axis Az, is defined in relation to one operation axis. In this regard, point P1, representing the position of the operation axis on the reference coordinate system, is determined as the origin of the specified coordinate system. Further, Z-axis Az coincides with the rotation centerline of the operation axis, and a plane C constituted by X-axis Ax and Y-axis Ay is perpendicular to the rotation centerline of the operation axis. A point P3 represents the position of front end 58 of robot 50, and corresponds to the force measurement point in this case. Plane C (or the X-Y plane) is constituted by X-axis Ax and Y-axis Ay of the coordinate system specified in relation to the operation axis.

In an example of the method for determining the operation as the movable operation axis or the immovable operation axis, a distance Ea between point P1 (or the origin of the operation axis) and point P3 representing the position of front end 58 of robot 50 is calculated in relation to each operation axis, and an operation axis among the operation axes, in which distance Ea is the shortest, is determined as the movable operation axis. Alternatively, an operation axis, in which distance Ea is within a predetermined threshold, may be determined as the movable operation axis.

In another method, a distance Eb between the rotation centerline of the operation axis and point P3 representing the position of front end 58 of robot 50 is calculated in relation to each operation axis, and an operation axis among the operation axes, in which distance Eb is the shortest, is determined as the movable operation axis. Alternatively, an operation axis, in which distance Eb is within a predetermined threshold, may be determined as the movable operation axis.

In still another method, a distance Ec between plane C (including the origin of the operation axis and perpendicular to the rotation centerline of the operation axis) and point P3 representing the position of front end 58 of robot 50 is calculated in relation to each operation axis, and an operation axis among the operation axes, in which distance Ec is the shortest, is determined as the movable operation axis. Alternatively, an operation axis, in which distance Ec is within a predetermined threshold, may be determined as the movable operation axis.

In still another method, the operation axis may be determined as the movable axis or the immovable axis, depending on in which region of the coordinate system associated with the operation axis front end 58 of robot 50 exists. For example, when the coordinate system is divided into eight regions (i.e., a first quadrant in which signs of the positions in the directions of X-axis Ax, Y-axis Ay and Z-axis Az are plus, plus and plus, respectively; a second quadrant in which signs of the positions in the directions of X-axis Ax, Y-axis Ay and Z-axis Az are minus, plus and plus, respectively; a third quadrant in which signs of the positions in the directions of X-axis Ax, Y-axis Ay and Z-axis Az are minus, minus and plus, respectively; a fourth quadrant in which signs of the positions in the directions of X-axis Ax, Y-axis Ay and Z-axis Az are plus, minus and plus, respectively; a fifth quadrant in which signs of the positions in the directions of X-axis Ax, Y-axis Ay and Z-axis Az are plus, plus and minus, respectively; a sixth quadrant in which signs of the positions in the directions of X-axis Ax, Y-axis Ay and Z-axis Az are minus, plus and minus, respectively; a seventh quadrant in which signs of the positions in the directions of X-axis Ax, Y-axis Ay and Z-axis Az are minus, minus and minus, respectively; and a eighth quadrant in which signs of the positions in the directions of X-axis Ax, Y-axis Ay and Z-axis Az are plus, minus and minus, respectively), the operation axis may be determined as the movable or the immovable axis in relation to each quadrant. Concretely, the determination may be performed based on in which quadrant point P3 (representing the position of front end 58 of robot 50) exists. In this case, another regional limitation may be added to each quadrant. For example, the regional limitation may be performed based on as to whether the position in each direction of X-axis Ax, Y-axis Ay and Z-axis is within a predetermined range, or as to whether distance Ea, Eb or Ec as explained above is within a predetermined range, etc. As such, when point P3 representing the position of front end 58 of robot 50 exists in a specified region or a specified quadrant of the coordinate system associated with the operation axis, the operation axis may be determined as the movable operation axis.

By using one of the above methods or a combination thereof, the operation axis may be specified as the movable operation axis or the immovable operation axis, based on the positional relationship between the operation axis and front end 58 of robot 50, depending on the status of the movement operation.

Next, a robot controller according to a third embodiment of the invention will be explained. In the robot controller of the third embodiment, only step S6, for specifying as to whether or not the operation axis can be moved by using operation axis specifying part 24, is different from robot controller 10 of the first embodiment, and the other steps may be the same as in the first embodiment. Therefore, a detail explanation of the third embodiment will be omitted in relation to the disclosure of FIGS. 2 and 3 similar to the first embodiment. In other words, in the third embodiment, the method by operation axis specifying part 24 is to specify as to whether or not the operation axis can be moved, depending on the status of the movement operation, and thus a basic concept of the method is common to the first embodiment.

In the third embodiment, operation axis specifying part 24 specifies the operation axis among the plurality of axes, which is to be moved in response to the force, and determines the direction of movement of the operation axis as a function of the direction of the force. Further, operation axis specifying part 24 determines as to whether or not the operation axis can be moved, depending on the status of the movement operation. In the third embodiment, in step S6, operation axis specifying part 24 specifies as to whether or not each operation axis can be moved, based on at least one of: the direction of the force applied to the operation axis measured by force measuring part 21; and the positional relationship between the operation axis and front end 58 of robot 50, and based on a predetermined priority order, depending on the status of the movement operation.

The process of operation axis specifying part 24 of the robot controller according to the third embodiment of the invention will be explained in detail. First, operation axis specifying part 24 specifies the operation axis, among the plurality of axes constituting robot 50, based on input, setting and current positions of the axes of robot 50. In the third embodiment, two or more axes are specified as the operation axes. In order to move a desired axis or an axis which satisfies a predetermined condition, or in order to not move another axis which satisfies another condition, a movable operation axis and an immovable operation axis are specified, depending on the status of the movement operation. In this regard, the "movable operation axis" means an operation axis which is allowed to be moved (or can be moved) in response to the force, and the "immovable operation axis" means an operation axis which is not allowed to be moved (or cannot be moved) even when the force is applied thereto.

In a method of the third embodiment, it is determined as to whether or not each operation axis can be moved, based on at least one of the direction of the force applied to the operation axis measured by force measuring part 21 (as explained in the first embodiment); and the positional relationship between the operation axis and front end 5B of robot 50 (as explained in the second embodiment), and based on a predetermined priority order, depending on the status of the movement operation.

The determining method based on the direction of the force applied to the operation axis measured by force measuring part 21 and the determining method based on the positional relationship between the operation axis and front end 58 of robot 50 may be combined so as to determine as to whether or not the operation axis can be moved, under a combination of a plurality of conditions. For example, when one operation axis is judged to be moved under at least one of the conditions, the operation axis may be determined as the movable operation axis. Alternatively, when one operation axis is judged to be moved under all of the conditions, the operation axis may be determined as the movable operation axis. Alternatively, a score when the operation axis is judged to be moved under each condition may be previously determined, and then, when a total score obtained by judging an operation axis under the plurality of conditions is equal to or larger than a predetermined value, the operation axis having the total score may be determined as the movable operation axis.

When the movable operation axis cannot be determined only by the method based on the direction of the force applied to the operation axis measured by force measuring part 21, or only by the method based on the positional relationship between the operation axis and front end 58 of robot 50, another method may be used for determining the movable operation axis. Concretely, the direction of the force applied to the operation axis measured by force measuring part 21, the positional relationship between the operation axis and front end 58 of robot 50, another method may be used for determining the movable operation axis, and the predetermined priority order may be used for determining the movable operation axis. For example, when the plurality of movable operation axes are determined and the number of movable operation axes should be limited, the movable operation axis may be selected based on the predetermined priority order. As such, in determining the operation axis as the movable operation axis or the immovable operation axis by using the conditions including the direction of the force, the positional relationship and the priority order as described above, a desired axis may be determined as the movable operation axis, and/or an unnecessary axis may be determined as the immovable operation axis.

Next, a robot controller according to a fourth embodiment of the invention will be explained. As shown in a flowchart of FIG. 9, the robot controller of the fourth embodiment is different from robot controller 10 of the first embodiment, in that steps S4 to S6 are deleted from the flowchart of FIG. 3. Further, in the fourth embodiment, operation axis specifying part 24 of FIG. 2 does not determine as to whether or not the operation axis can be moved, instead, selects and specifies two operation axes among the plurality of axes constituting robot 50, in order to facilitate the movement of a desired axis.

In the robot controller of the first, second or third embodiment, when the plurality of operation axes are specified, it is determined as to whether or not each operation axis can be moved, depending on the status of the movement operation, so as to move a desired axis. On the other hand, in the robot controller of the fourth embodiment, when the plurality of operation axes are specified, two operation axes are previously specified in order to facilitate the movement of a desired axis. In other words, in the fourth embodiment, by specifying appropriate two axes as the operation axes, among the plurality of axes constituting robot 50, a desired axis can be selectively moved in the movement operation. A basic concept of the fourth embodiment is common to the first, second and third embodiments, in that the robot controller performs the method for selectively moving a desired axis when the plurality of operation axes to be moved in response to the force are specified.

Figure 9:
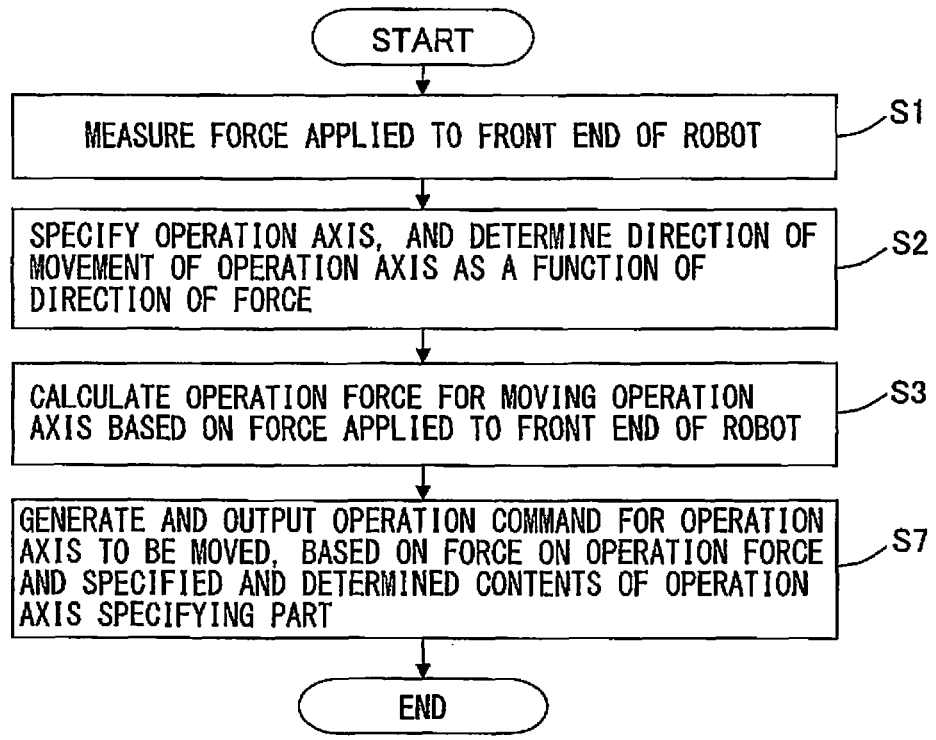

As shown in FIG. 9, when the process for moving robot 50 is initiated and an external force is applied to front end 58 of robot 50 by operator 60, etc., force measuring part 21 measures the force applied to front end 58 (step S1). Then, operation axis specifying part 24 specifies the operation axis to be moved in response to the force, and determines the direction of movement of the operation axis as a function of the direction of the force (step S2).

Next, operation force calculating part 22 calculates the operation force for moving the position of the operation axis specified by operation axis specifying part 24, based on the force applied to front end 58 of robot 50 measured by force measuring part 21 (step S3). Then, operation commanding part 23 generates and outputs an operation command for moving the position of the operation axis, based on the operation force calculated by operation force calculating part 22 and the specified and determined contents of operation axis specifying part 24 (step S7).

The process by operation axis specifying part 24 of the robot controller of the fourth embodiment will be explained in detail. In step S2, operation axis specifying part 24 specifies the operation axis to be moved in response to the force, and determines the direction of movement of the operation axis as a function of the direction of the force. In this regard, operation axis specifying part 24 specifies two rotation axes as the operation axes, among the plurality of axes constituting robot 50, wherein the rotation centerlines of the two rotation axes intersect at right angles with each other, regardless of the positions of the plurality of axes.

By specifying the two rotation axes as the operation axes as explained above, when the direction of the force applied to front end 58 of robot 50 is properly selected, the operation axes can be independently moved, and thus a desired axis can be moved in response to the force. In other words, when only one of the two specified operation axes should be moved, only the desired operation axis can be moved by applying the force to front end 58 in the direction parallel to the rotation centerline of the other operation axis.

The method for specifying the operation axes as described above will be explained with reference to FIG. 1. In this case, operation force calculating part 22 calculates the operation force based on the force applied about the rotation centerline of the operation axis, as explained in relation to robot controller 10 of the first embodiment. The direction of movement of the operation axis as a function of the direction of the force is the same as the direction of the operation force.

In robot 50 constituted by the axes as shown in FIG. 1, for example, J1 axis 51 and J2 axis 52 may be specified as the two operation axes. These axes are configured as two rotation axes so that the rotation centerlines thereof intersect with each other at right angles, regardless of the positions of the plurality of axes constituting robot 50 (the same is also applicable to two rotation axes as explained below). In this case, when the translational force is applied to front end 58 of robot 50 in the direction parallel to the rotation centerline of J2 axis 52, J1 axis 51 can be moved based on the operation force calculated by operation force calculating part 22, since the force about the rotation centerline is applied to J1 axis 51. In contrast, J2 axis 52 cannot be moved since the force about the rotation centerline thereof is not applied thereto. On the other hand, when the translational force is applied to front end 58 of robot 50 in the direction parallel to the rotation centerline of J1 axis 51, J2 axis 52 can be moved based on the operation force calculated by operation force calculating part 22, since the force about the rotation centerline is applied to J2 axis 52. In contrast, J1 axis 51 cannot be moved since the force about the rotation centerline thereof is not applied thereto.

Alternatively, J3 axis 53 and J4 axis 54 may be specified as the two operation axes. Otherwise, J4 axis 54 and J5 axis 55 may be specified as the two operation axes. Otherwise, J5 axis 55 and J6 axis 56 may be specified as the two operation axes. In any case, when only one of the two specified operation axes should be moved, only the desired operation axis can be moved by applying the force to front end 58 in the direction parallel to the rotation centerline of the other operation axis.

As explained above, by specifying the two rotation axes, having the rotation centerlines intersecting at right angles regardless of the positions of the axes constituting robot 50, as the operation axes, when the direction of the force applied to front end 58 of robot 50 is properly selected, only a desired axis can be moved in response to the force. By virtue of this, an axis to be moved can be selected without switching or setting the axis to be moved by means of a teaching operation device, etc., and two axes can be simultaneously moved depending on the position of each axis of robot 50 and/or the direction of the applied force.

In a robot controller according to a fifth embodiment of the invention, in addition to the fourth embodiment, operation axis specifying part 24 specifies as to whether or not each operation axis can be moved, based on at least one of the direction of the force applied to the operation axis measured by force measuring part 21, and the positional relationship between the operation axis and front end 58 of robot 50, and a predetermined priority order, depending on the status of the movement operation.

As shown in a flowchart of FIG. 10, the robot controller of the fifth embodiment is different from the robot controller of the fourth embodiment, in that step S6 for determining as to whether or not the operation axis can be moved, depending on the status of the movement operation, is added to the flowchart of FIG. 9. Also in the fifth embodiment, similarly to the robot controllers of the other embodiments, the method for selectively moving a desired axis, when the plurality of operation axes are specified, is performed.

In the movement operation of the operation axis by the robot controller of the fourth embodiment, when only one of the two operation axes should be moved, only the desired operation axis can be moved by applying the force to front end 58 in the direction parallel to the rotation centerline of the other operation axis. In this regard, depending on the status of the movement operation, it may be difficult to apply the force to front end 58 in the direction parallel to the rotation centerline of the other operation axis. Even when the force is applied to front end 58 in the direction parallel to the rotation centerline of the other operation axis, the magnitude of the operation force may be zero or the operation force may not be generated, whereby it may be difficult to move the desired operation axis. In the fifth embodiment, the desired axis can be moved even when the applied force is not parallel to the rotation centerline of the other operation axis.

In step S2 of FIG. 10, operation axis specifying part 24 specifies the operation axis among the plurality of axes, which is to be moved in response to the force, and determines the direction of movement of the operation axis as a function of the direction of the force. Therefore, based on input by the operator and/or the current position of each axis of robot 50, operation axis specifying part 24 specifies two rotation axes, having the rotation centerlines intersecting at right angles regardless of the positions of the axes constituting robot 50, as the operation axes.

In step S6 of FIG. 10, operation axis specifying part 24 determines as to whether or not each operation axis can be moved, based on at least one of the direction of the force applied to the operation axis measured by force measuring part 21, and the positional relationship between the operation axis and front end 58 of robot 50, and a predetermined priority order, depending on the status of the movement operation.

In step S6, as a method for determining as to whether the operation axis is specified as the movable operation axis or the immovable operation axis, at least one of: the determining method based on the direction of the force applied to the operation axis measured by force measuring part 21; the determining method based on the positional relationship between the operation axis and front end 58 of robot 50; and the determining method based on the predetermined priority order, may be used. The priority order in relation to the operation axes may be predetermined, and when both the two operation axes are moved based on the operation force calculated based on the force applied to front end 58 of robot 50, determine as to whether or not the operation axis can be moved, one of the axes may be moved based on the priority order.

In addition, the method by operation axis specifying part 24 for determining as to whether or not the operation axis can be moved, depending on the status of the movement operation, may be applied to the two operation axes, respectively.

In a sixth embodiment of the invention, as shown in FIG. 11, robot system 11 includes a teaching operation device 70 for inputting various settings to robot controller 10, and operation axis specifying part 24 specifies the operation axis based on input from teaching operation device 70. Then, teaching operation device 70 selects and inputs a combination of axes capable of being specified as the operation axes.

Figure 12:
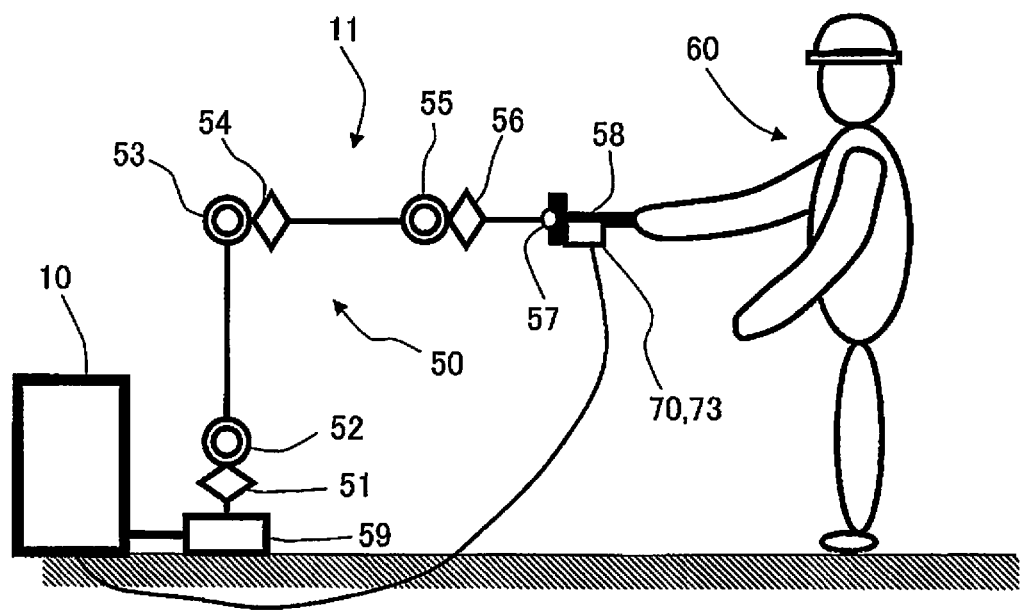

As shown in FIG. 11, in robot system 11 including robot 50 controlled by robot controller 10, teaching operation device 70 for inputting various settings to robot controller 10 is connected to robot controller 10. As shown in FIG. 12, teaching operation device 70 may be attached to a proper portion of robot 50 (for example, front end 58 or a link connecting the axes of robot 50), in order that operator 60 does not have to hold teaching operation device 70 when inputting various settings, etc. Further, teaching operation device 70 may have a function for displaying and outputting various statuses regarding the movement operation of robot 50, etc., a function for inputting various settings, and a function for inputting a command regarding the movement or stoppage operation for robot 50.

Operation axis specifying part 24 specifies the operation axis based on input from teaching operation device 70. In this case, two rotation axes among the plurality of axes constituting robot 50, having the rotation centerlines intersecting at right angles regardless of the positions of the axes, may be specified as the operation axes.

Figure 13A:
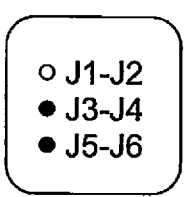
FIGS. 13a to 14b show examples of displays on the teaching operation device which inputs setting to the robot controller according to the embodiment of the present invention.
Figure 13B:
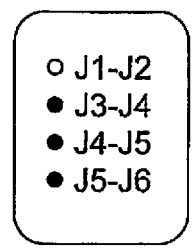

FIGS. 13a and 13b show examples in which axes capable of being specified as the operation axes are indicated as options, and the operation axis can be input (specified) among the options. For example, option "J1-J2" represents that J1 axis and J2 axis are selected as the operation axes, and a color or shape of a mark associated with the option (in the drawings, a mark displayed on the left side of a character) indicates as to whether or not the associated option (or the combination of axes) is selected. In this regard, after one option or combination is selected, it is preferable that the operator cannot select options or combinations other than the selected option or combination.

In the example of FIG. 13b, the options include option "J4-J5" which represents a combination of J4 axis and J5 axis as the two operation axes. On the other hand, in the example of FIG. 13a, the options do not include option "J4-J5," and thus such an option cannot be selected in FIG. 13a. As such, an undesired combination of the operation axis can be specified so as not to be selected. By virtue of this, the operation axes can be easily selected or specified, even though it is difficult to understand as to which combination of the axes is appropriate or can be selected, when two rotation axes among the plurality of axes constituting robot 50, having the rotation centerlines intersecting at right angles regardless of the positions of the axes, should be specified as the operation axes.

In a seventh embodiment of the invention, as shown in FIG. 12, robot system 11 includes a teaching operation device 70 for inputting various settings to robot controller 10, and operation axis specifying part 24 specifies the operation axis based on input from teaching operation device 70. Then, teaching operation device 70 displays an axis capable of being selected as the operation axis, among the plurality of axes constituting robot 50, and displays an axis other than the selected axis while representing at least one of: that the axis other than the selected axis can be simultaneously selected as the operation axis; and that the axis other than the selected axis cannot be simultaneously selected as the operation axis, as shown in FIGS. 14a and 14b.

Therefore, by changing a color or shape of a mark, a button or a character associated with each axis indicated as an option, or by adding a closing line or underline to the mark, etc., it can be indicated as to whether or not each option can be selected. In this case, two rotation axes among the plurality of axes constituting robot 50, having the rotation centerlines intersecting at right angles regardless of the positions of the axes, may be specified as the operation axes.

Figure 14A:
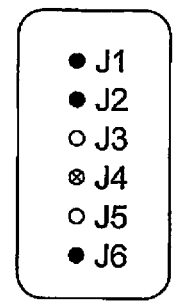

In the example of FIG. 14a, among the axes constituting robot 50, axes capable of being specified as the operation axes are displayed, and J4 axis has already been selected as the operation axis. In this case, the color and/or shape of the mark on the left side of each of characters representing J3 axis and J5 axis is changed, so as to display that J3 axis or J5 axis can be combined with J4 axis as the operation axis. Further, the color and/or shape of the mark on the left side of each of characters representing the other axes (i.e., J1 axis, J2 axis and J6 axis) is changed, so as to display that the other axes cannot be combined with J4 axis as the operation axis.

Figure 14B:
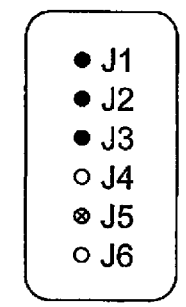

On the other hand, in the example of FIG. 14b, J5 axis has already been selected as the operation axis. In this case, the color and/or shape of the mark on the left side of each of characters representing J4 axis and J6 axis is changed, so as to display that J4 axis or J6 axis can be combined with J5 axis as the operation axis. Further, the color and/or shape of the mark on the left side of each of characters representing the other axes is changed, so as to display that the other axes cannot be combined with J5 axis as the operation axis.

As explained above, in the seventh embodiment, when one axis among the plurality of axes constituting robot 50 is specified as the operation axis, the other axis capable of being simultaneously selected as the operation axis, and/or the other axis incapable of being simultaneously selected as the operation axis, is visually indicated. By virtue of this, the operation axes can be easily selected or specified, even though it is difficult to understand as to which combination of the axes is appropriate, when two rotation axes among the plurality of axes constituting robot 50, having the rotation centerlines intersecting at right angles regardless of the positions of the axes, should be specified as the operation axes.

In an eighth embodiment of the invention, in addition to the first, second, third or fifth embodiment, robot system 11 includes a display device 73 such as teaching operation device 70, and display device 73 a specifying condition used when operation axis specifying part 24 determines as to whether or not the operation axis can be moved. Display device 73 may be separated from teaching operation device 70. Display device 73 may have only a display function, unlike teaching operation device 70 having a display function and an input function. By displaying the above specifying condition on display device 73, it can be easily understood as to how the movement operation is performed in order to move a desired axis, etc., whereby the operability of the movement of the axis can be improved.

In a ninth embodiment of the invention, in addition to the sixth or seventh embodiment, when the minimum distance between front end 58 of robot 50 and the rotation centerline of one rotation axis among the plurality of axes constituting robot 50, calculated based on the current positions of the axes of robot 50, is equal to or smaller than a predetermined threshold, the teaching operation device may represent that front end 58 of robot 50 exists near the rotation centerline of the rotation axis, or that the rotation axis cannot be specified as the operation axis.

When the minimum distance between front end 58 of robot 50 and the rotation centerline of the operation axis, calculated based on the current positions of the axes of robot 50, is smaller than a predetermined threshold, the operation force of the operation axis cannot be properly calculated by applying the translational force to front end 5B of robot 50, whereby the operation axis may not be moved as desired. The teaching operation device represents that front end 58 of robot 50 is near the rotation centerline of the rotation axis, or that such an axis cannot be specified as the operation axis, in order to inform the operator of such a situation, and thereby avoid the situation.

In the sixth or seventh embodiment of the invention, when the operation axis is specified by using teaching operation device 70, among the options including the combinations of the axes, an option, in which the minimum distance between front end 58 of robot 50 and the rotation centerline of one of the axis included in the option is smaller than a predetermined threshold, may be determined as unselectable option. Further, when one operation axis is specified by using teaching operation device 70, it is preferable that the other axis in which the above minimum distance is smaller than a predetermined threshold be displayed as unselectable axis on the device. By virtue of this, the operation axis can be appropriately specified, whereby the operability of the robot can be improved.

According to the present invention, in an operation method for moving the robot by applying the force to the front end of the robot, the position of a desired axis of the robot can be easily moved, without using a special input device and without carrying out input operation for switching a moving method.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot controller for moving a robot having a plurality of axes, the robot controller comprising:
   a force measuring part configured to measure a force applied to a front end of the robot;
   an operation force calculating part configured to, based on the force measured by the force measuring part, calculate an operation force for performing movement operation regarding a position of each axis among the plurality of axes of the robot;
   an operation commanding part configured to output a command for moving the robot; and
   an operation axis specifying part configured to perform specifying, among the plurality of axes, at least one operation axis to be moved in response to the force, and
   determining a direction of movement of the at least one operation axis as a function of a direction of the force,
   wherein, when one operation axis is specified by said specifying, the operation axis specifying part is configured to perform judging that the one operation axis is allowed to move in response to the force,
   wherein, when two or more operation axes are specified by said specifying, the operation axis specifying part is configured to perform judging whether each operation axis among the two or more operation axes is allowed to move in response to the force or whether said each operation axis is not allowed to move even when the force is applied thereto,
   said judging (1) being based on the direction of the force relative to said each operation axis, and (2) depending on a status of the movement operation, and
   wherein the operation commanding part is configured to, based on (i) said specifying, said determining and said judging by the operation axis specifying part and (ii) the operation force calculated by the operation force calculating part, output an operation command for moving a position of
   (a) the one operation axis, when the one operation axis is specified by said specifying, or
   (b) each operation axis among the two or more operation axes that is judged as allowed to move, when the two or more operation axes are specified by said specifying.

2. A robot system comprising the robot and the robot controller as set forth in claim 1.

3. The robot system as set forth in claim 2, further comprising a teaching operation device configured to input settings to the robot controller,
   wherein the operation axis specifying part is configured to specify the at least one operation axis based on input from the teaching operation device, and
   wherein the teaching operation device is configured to select an option among a plurality of options and input the selected option, the plurality of options including combinations of one or more axes to be specified as the at least one operation axis.

4. The robot system as set forth in claim 3, wherein, based on current positions of the plurality of axes of the robot, when a minimum distance between the front end of the robot and a rotation centerline of a rotation axis among the plurality of axes is equal to or smaller than a predetermined threshold, the teaching operation device is configured to display
that the front end of the robot exists near the rotation centerline of the rotation axis, or
that the rotation axis is not specifiable as an operation axis.

5. The robot system as set forth in claim 2, further comprising a teaching operation device configured to input settings to the robot controller, wherein the operation axis specifying part is configured to perform said specifying based on input from the teaching operation device, and wherein the teaching operation device is configured to, among the plurality of axes,
display an axis selectable as an operation axis, and
displays a further axis other than the selectable axis while representing one of:
that the further axis is simultaneously selectable as another operation axis, and
that the further axis is not simultaneously selectable as another operation axis.

6. A robot system comprising the robot and the robot controller as set forth in claim 1, wherein
the robot system further comprises a display device, and
the display device is configured to display a specified condition by which the operation axis specifying part is configured to perform said judging.

7. A robot controller for moving a robot having a plurality of axes, the robot controller comprising:
a force measuring part configured to measure a force applied to a front end of the robot;
an operation force calculating part configured to, based on the force measured by the force measuring part, calculate an operation force for performing movement operation regarding a position of each axis among the plurality of axes of the robot;
an operation commanding part configured to output a command for moving the robot; and
an operation axis specifying part configured to perform
specifying, among the plurality of axes, at least one operation axis to be moved in response to the force, and
determining a direction of movement of the at least one operation axis as a function of a direction of the force,
wherein, when one operation axis is specified by said specifying, the operation axis specifying part is configured to perform judging that the one operation axis is allowed to move in response to the force,
wherein, when two or more operation axes are specified by said specifying, the operation axis specifying part is configured to perform judging whether each operation axis among the two or more operation axes is allowed to move in response to the force or whether said each operation axis is not allowed to move even when the force is applied thereto,
said judging (1) being based on a positional relationship between said each operation axis and the front end of the robot, and (2) depending on a status of the movement operation, and
wherein the operation commanding part is configured to, based on (i) said specifying, said determining and said judging by the operation axis specifying part and (ii) the operation force calculated by the operation force calculating part, output an operation command for moving a position of
(a) the one operation axis, when the one operation axis is specified by said specifying, or
(b) each operation axis among the two or more operation axes that is judged as allowed to move, when the two or more operation axes are specified by said specifying.

8. A robot controller for moving a robot having a plurality of axes, the robot controller comprising:
a force measuring part configured to measure a force applied to a front end of the robot;
an operation force calculating part configured to, based on the force measured by the force measuring part, calculate an operation force for performing movement operation regarding a position of each axis among the plurality of axes of the robot;
an operation commanding part configured to output a command for moving the robot; and
an operation axis specifying part configured to perform
specifying, among the plurality of axes, at least one operation axis to be moved in response to the force, and
determining a direction of movement of the at least one operation axis as a function of a direction of the force,
wherein, when one operation axis is specified by said specifying, the operation axis specifying part is configured to perform judging that the one operation axis is allowed to move in response to the force,
wherein, when two or more operation axes are specified by said specifying, the operation axis specifying part is configured to perform judging whether each operation axis among the two or more operation axes is allowed to move in response to the force or whether said each operation axis is not allowed to move even when the force is applied thereto,
said judging being based on at least one of (a) the direction of the force relative to said each operation axis, (b) a positional relationship between said each operation axis and the front end of the robot, and (c) a predetermined priority order, and
said judging depending on a status of the movement operation, and
wherein the operation commanding part is configured to, based on (i) said specifying, said determining and said judging by the operation axis specifying part and (ii) the operation force calculated by the operation force calculating part, output an operation command for moving a position of
(a) the one operation axis, when the one operation axis is specified by said specifying, or
(b) each operation axis among the two or more operation axes that is judged as allowed to move, when the two or more operation axes are specified by said specifying.

9. A robot controller for moving a robot having a plurality of axes including two or more rotation axes, the robot controller comprising:
a force measuring part configured to measure a force applied to a front end of the robot;
an operation force calculating part configured to, based on the force measured by the force measuring part, calculate an operation force for performing movement operation regarding a position of each axis among the plurality of axes of the robot;

an operation commanding part configured to output a command for moving the robot; and an operation axis specifying part configured to perform specifying, among the plurality of axes, two rotation axes, which have rotation centerlines intersecting at right angles regardless of positions of the plurality of axes, as operation axes to be moved in response to the force, and determining a direction of movement of the operation axes as a function of a direction of the force, wherein the operation commanding part is configured to output an operation command for moving a position of each of the operation axes, based on (i) said specifying and said determining by the operation axis specifying part and (ii) the operation force calculated by the operation force calculating part.

10. A robot controller for moving a robot having a plurality of axes including two or more rotation axes, the robot controller comprising:

a force measuring part configured to measure a force applied to a front end of the robot;

an operation force calculating part configured to, based on the force measured by the force measuring part, calculate an operation force for performing movement operation regarding a position of each axis among the plurality of axes of the robot;

an operation commanding part configured to output a command for moving the robot; and an operation axis specifying part configured to perform specifying, among the plurality of axes, two rotation axes, which have rotation centerlines intersecting at right angles regardless of positions of the plurality of axes, as operation axes to be moved in response to the force, determining a direction of movement of the operation axes as a function of a direction of the force, and judging whether each operation axis among the operation axes is allowed to move in response to the force or whether said each operation axis is not allowed to move even when the force is applied thereto, said judging being based on at least one of (a) the direction of the force relative to said each operation axis, (b) a positional relationship between said each operation axis and the front end of the robot, and (c) a predetermined priority order, and said judging depending on a status of the movement operation, and wherein the operation commanding part is configured to output an operation command for moving a position of each of the operation axes, based on (i) said specifying, said determining and said judging by the operation axis specifying part and (ii) the operation force calculated by the operation force calculating part.

* * * * *